(12) United States Patent
Jung et al.

(10) Patent No.: US 9,461,690 B2
(45) Date of Patent: *Oct. 4, 2016

(54) MOBILE TERMINAL

(71) Applicant: LG ELECTRONICS INC., Seoul (KR)

(72) Inventors: Hojae Jung, Seoul (KR); Yung Kim, Seoul (KR); Jumin Chi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/550,741

(22) Filed: Nov. 21, 2014

(65) Prior Publication Data

US 2015/0079944 A1 Mar. 19, 2015

Related U.S. Application Data

(63) Continuation of application No. 13/152,925, filed on Jun. 3, 2011, now Pat. No. 8,922,506.

(30) Foreign Application Priority Data

Feb. 23, 2011 (KR) ........................ 10-2011-0015992

(51) Int. Cl.
| | | |
|---|---|---|
| *H04B 1/38* | (2015.01) | |
| *H04B 1/3888* | (2015.01) | |
| *G06F 1/16* | (2006.01) | |
| *G06F 1/32* | (2006.01) | |
| *H04M 1/725* | (2006.01) | |
| *G06F 3/041* | (2006.01) | |

(52) U.S. Cl.
CPC ........... *H04B 1/3888* (2013.01); *G06F 1/1626* (2013.01); *G06F 1/1677* (2013.01); *G06F 1/32* (2013.01); *G06F 3/041* (2013.01); *H04M 1/72569* (2013.01); *H04M 1/72577* (2013.01); *G06F 2200/1633* (2013.01); *H04M 2250/12* (2013.01); *H04M 2250/22* (2013.01)

(58) Field of Classification Search
CPC .... G06F 3/044; G06F 3/041; G06F 3/04886; G06F 1/1626; G06F 3/0488; G06F 2200/1633; G06F 3/0412; G06F 1/1637; G06F 2200/1634; G06F 1/1628
See application file for complete search history.

(56) References Cited

U.S. PATENT DOCUMENTS

| | | | | |
|---|---|---|---|---|
| 6,636,203 B1* | 10/2003 | Wong | ................... | G06F 3/04886 178/18.01 |
| 7,069,056 B2* | 6/2006 | Iwata | ................... | H04M 1/0214 455/550.1 |
| 8,382,294 B2* | 2/2013 | Hua | ..................... | G06F 1/1626 345/1.1 |
| 2004/0121821 A1* | 6/2004 | Hamasaki | ............. | H02J 7/0044 455/572 |
| 2006/0022954 A1* | 2/2006 | Berry | .................... | G06F 1/1616 345/173 |

(Continued)

OTHER PUBLICATIONS

United States Patent and Trademark Office U.S. Appl. No. 15/053,955, Office Action dated Apr. 27, 2016, 28 pages.

*Primary Examiner* — Sanjiv D Patel
(74) *Attorney, Agent, or Firm* — Lee Hong Degerman Kang & Waimey; Jonathan Kang; Jeffrey Lotspeich

(57) ABSTRACT

A mobile terminal and a control method of a mobile terminal are disclosed. The mobile terminal and a control method thereof provide a user interface allowing for a user to easily and effectively control the mobile terminal through an interaction between a certain case and the mobile terminal when the mobile terminal is accommodated in the case in a lock mode.

16 Claims, 19 Drawing Sheets

(56) References Cited

U.S. PATENT DOCUMENTS

| | | | |
|---|---|---|---|
| 2006/0073819 A1* | 4/2006 | Lowles | H04M 1/6041 455/418 |
| 2006/0211458 A1* | 9/2006 | Pletikosa | G06F 1/1626 455/575.3 |
| 2007/0150826 A1* | 6/2007 | Anzures | G06F 3/017 715/772 |
| 2007/0174782 A1 | 7/2007 | Russo | |
| 2008/0053770 A1* | 3/2008 | Tynyk | A45C 11/00 190/100 |
| 2009/0096417 A1* | 4/2009 | Idzik | H02J 7/0044 320/115 |
| 2009/0187676 A1* | 7/2009 | Griffin | H04M 1/67 710/14 |
| 2010/0120468 A1 | 5/2010 | Moran et al. | |
| 2010/0159984 A1 | 6/2010 | Nguyen et al. | |
| 2011/0071912 A1 | 3/2011 | McNamara et al. | |
| 2011/0076981 A1 | 3/2011 | Singh et al. | |
| 2011/0136552 A1* | 6/2011 | Lee | H04M 1/0245 455/575.3 |
| 2011/0210834 A1* | 9/2011 | Pasquero | G06F 3/016 340/407.1 |

* cited by examiner

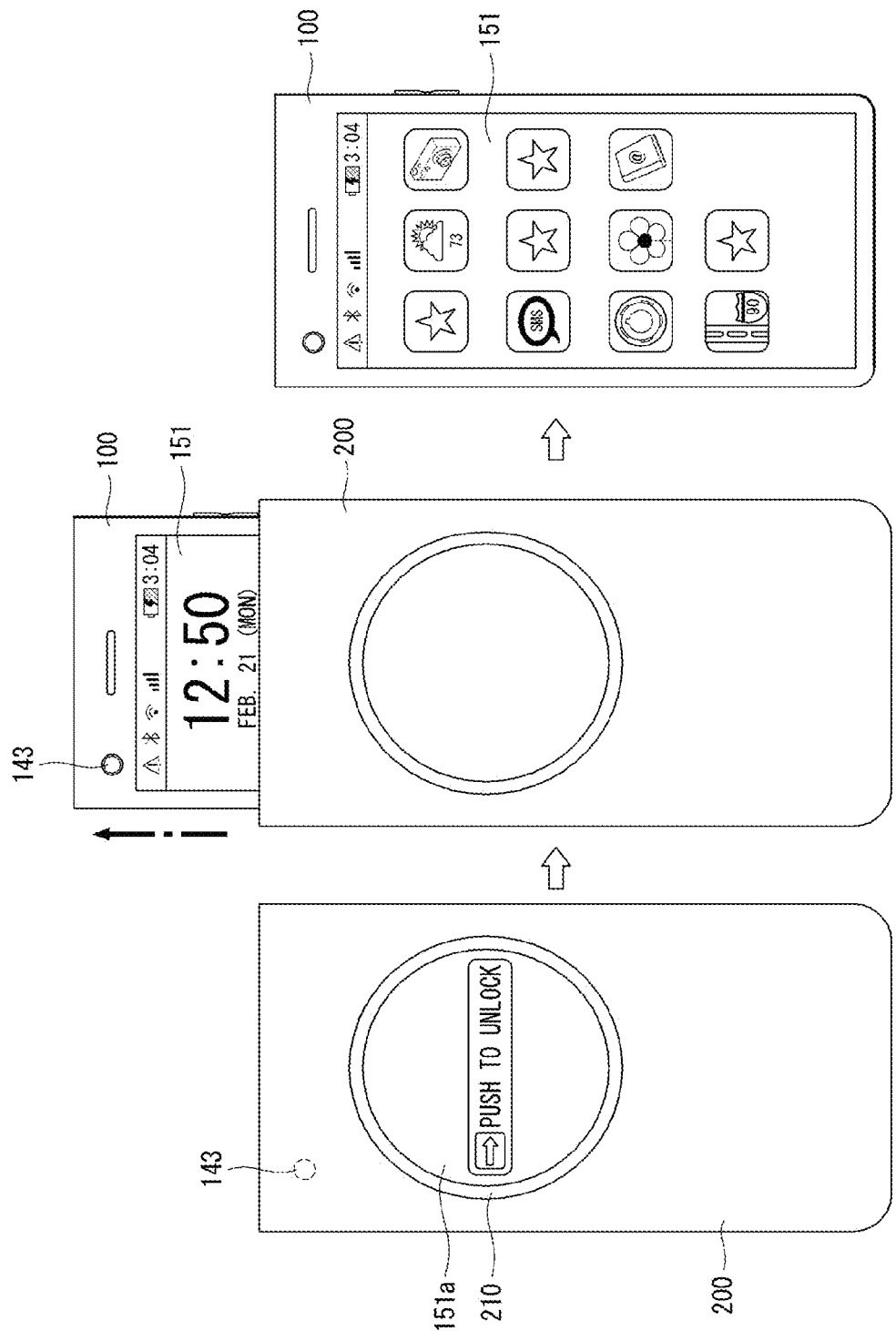

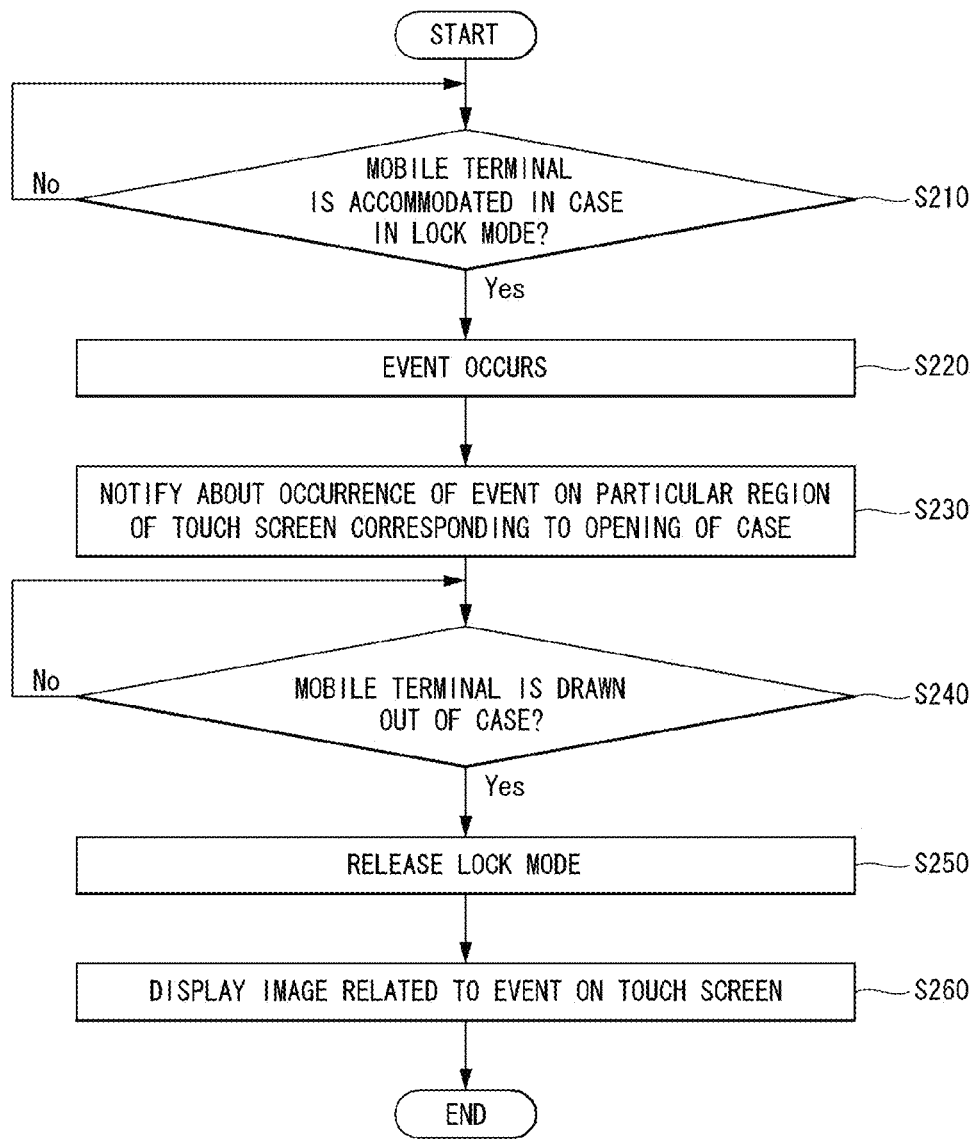

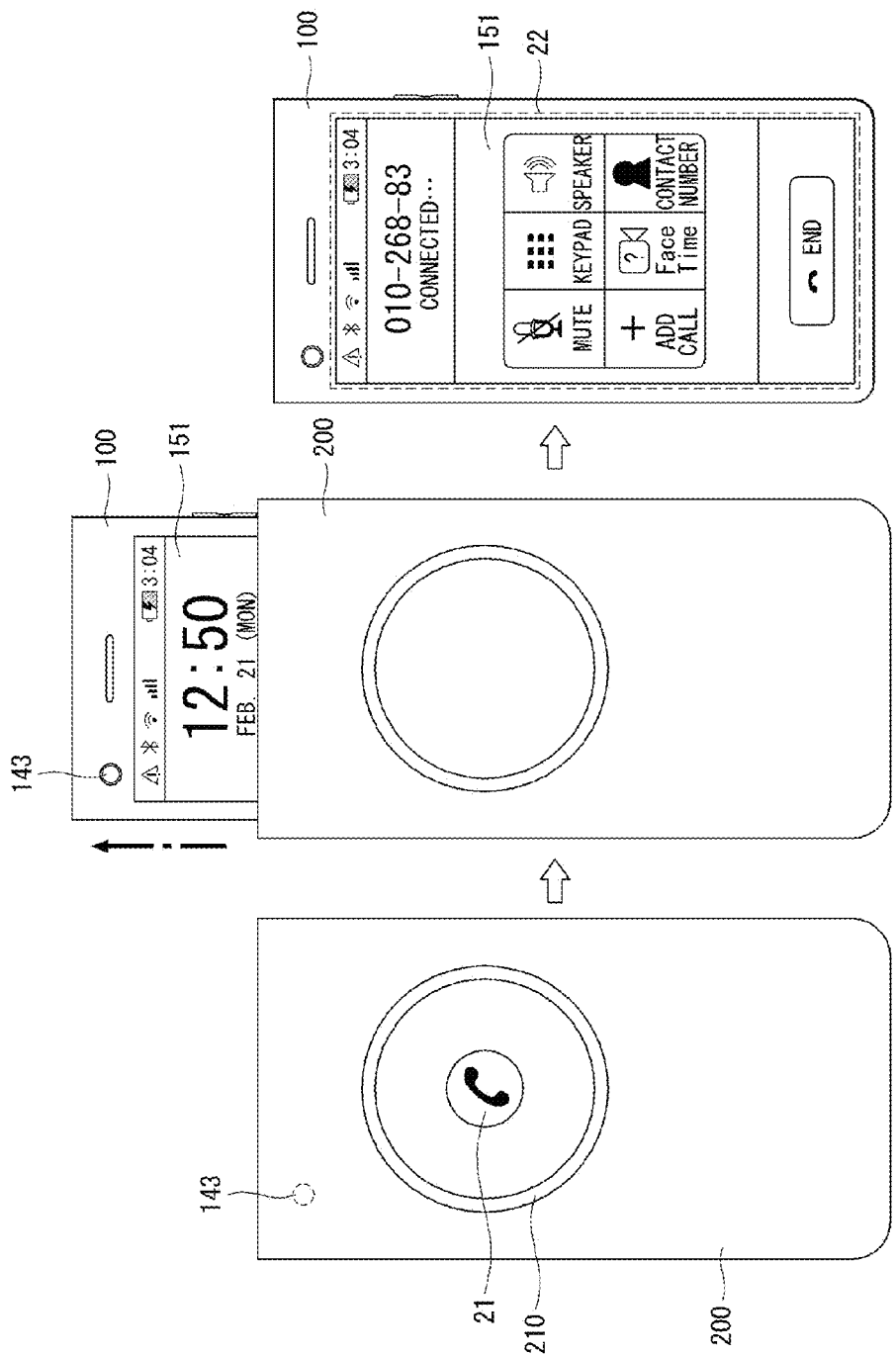

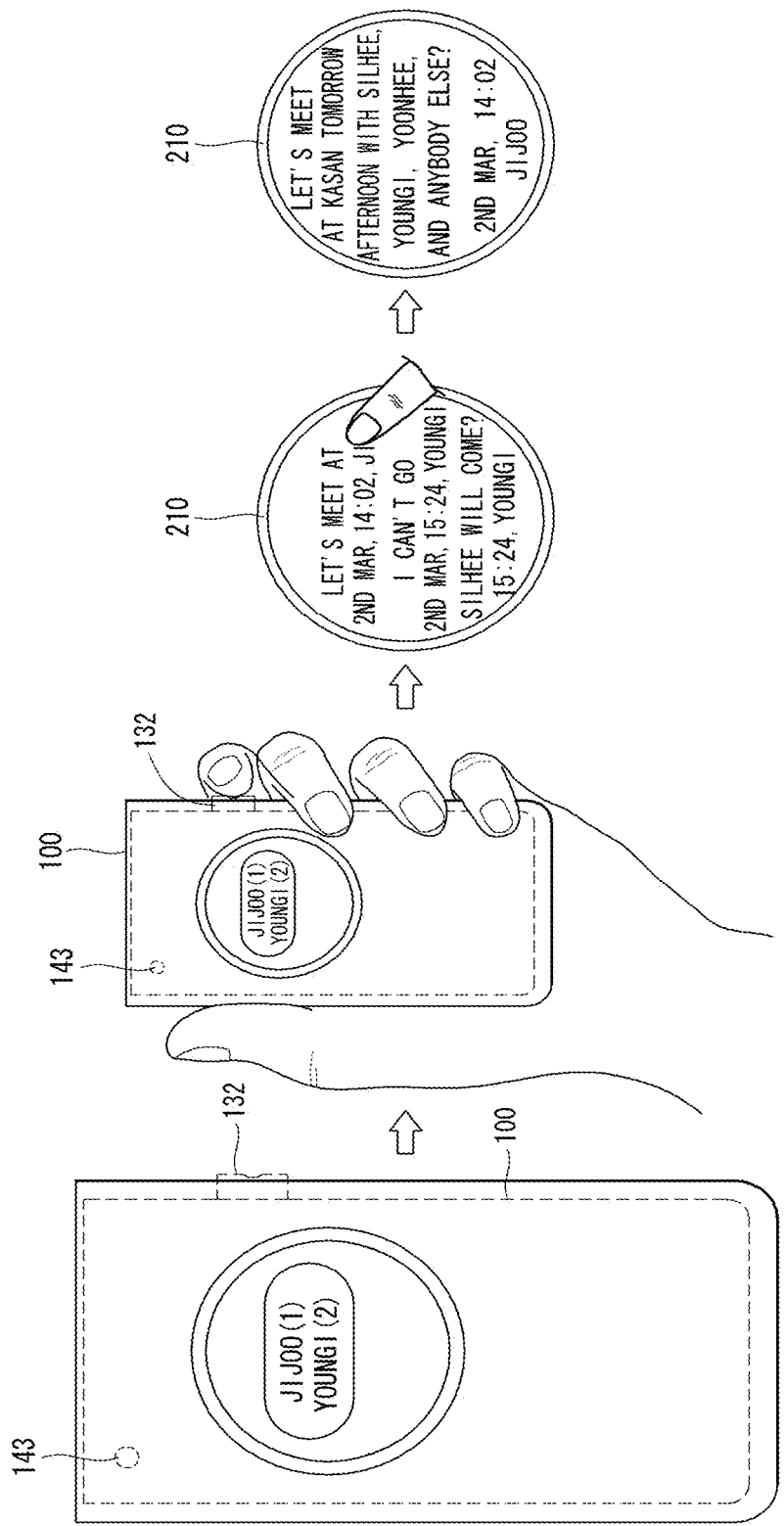

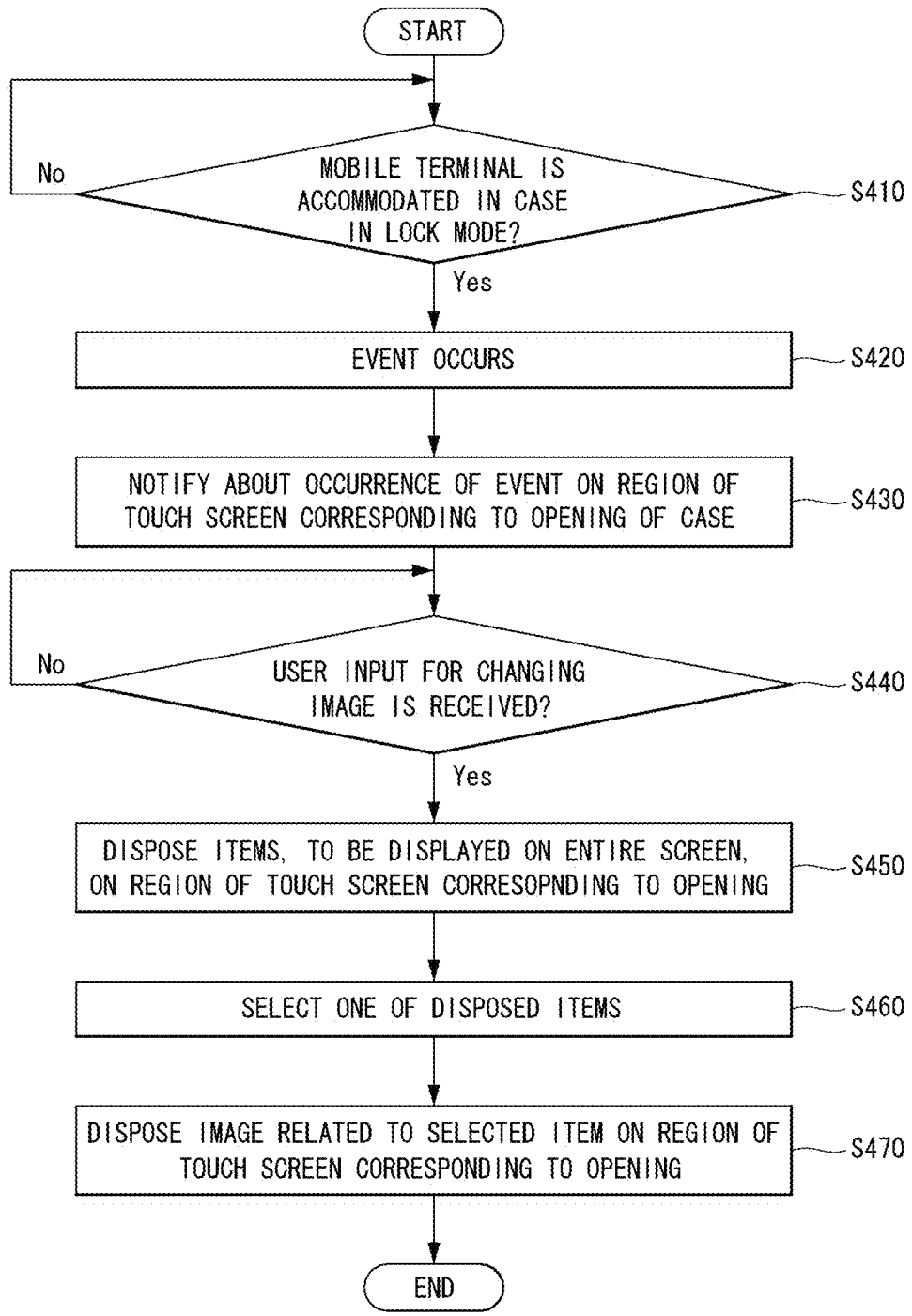

MOBILE TERMINAL

CROSS-REFERENCE TO RELATED APPLICATIONS

This application is a continuation of U.S. application Ser. No. 13/152,925, filed on Jun. 3, 2011, now U.S. Pat. No. 8,922,506, which claims the benefit of earlier filing date and right of priority to Korean Patent Application No. 10-2011-0015992, filed on Feb. 23, 2011, the contents of which are all hereby incorporated by reference herein in their entirety.

BACKGROUND

1. Field

The present invention relates to a mobile terminal and a control method thereof.

2. Related Art

Recently, various functions have been provided to users according to a remarkable advancement of software and hardware in various electronic device fields including mobile terminals.

Thus, the necessity of developing and supplying of multiple user interfaces allowing users to easily and effectively control a mobile terminal providing diverse, complicated functions is increasing.

SUMMARY

A mobile terminal according to an aspect of the present invention includes: a sensing unit configured to sense whether or not a mobile terminal is received by a mobile terminal accommodation case; and a controller configured to control an operation mode of the mobile terminal in any one of a lock mode and an unlock mode according to the sensing results of the sensing unit.

A control method of a mobile terminal according to another aspect of the present invention includes: sensing whether or not a mobile terminal is received by a mobile terminal accommodation case; and setting an operation mode of the mobile terminal in any one of a lock mode and an unlock mode according to whether or not the mobile terminal is received by the case.

A control method of a mobile terminal according to another aspect of the present invention includes: receiving a particular event in a state in which a mobile terminal is received in a case having an opening exposing at least a portion of a touch screen of the mobile terminal; displaying information indicating the occurrence of the particular event on the portion of the touch screen corresponding to the opening; releasing the lock mode of the mobile terminal when the mobile terminal is drawn out of the case; and displaying an image related to the particular event on the touch screen.

A control method of a mobile terminal according to another aspect of the present invention includes: receiving a particular event in a state in which a mobile terminal is received in a case having an opening exposing at least a portion of a touch screen of the mobile terminal; receiving an input for executing a function related to the particular event; and executing the function related to the particular event in a state in which the mobile terminal is received in the case.

Details of other embodiments are included in a detailed description and drawings.

BRIEF DESCRIPTION OF THE DRAWINGS

The above and other objects and features of the present invention will become apparent from the following description of preferred embodiments given in conjunction with the accompanying drawings, in which:

FIGS. 6A, 6B, 7(a), 7(b), and 7(c) are views illustrating examples of the method for controlling a mobile terminal according to the embodiments illustrated in FIG. 5;

FIG. 8 is a flowchart illustrating the process of a method for controlling a mobile terminal according to an embodiment of the present invention;

FIGS. 9(a), 9(b), 9(c), 10(a), 10(b), and 10(c) are views illustrating examples of the method for controlling a mobile terminal according to the embodiments illustrated in FIG. 8;

FIGS. 12(a), 12(b), 12(c), 13(a), 13(b), 13(c), 14(a), 14(b), 14(c), and 14(d) are views illustrating examples of the method for controlling a mobile terminal according to the embodiments illustrated in FIG. 11;

FIG. 15 is a flowchart illustrating the process of a method for controlling a mobile terminal according to an embodiment of the present invention;

DETAILED DESCRIPTION OF THE EMBODIMENTS

Reference will now be made in detail to the preferred embodiments of the present invention, examples of which are illustrated in the accompanying drawings.

The mobile terminal described in the present invention includes, for example, mobile phones, smart phones, computers, notebook computers, digital broadcasting terminals, PDAs (Personal Digital Assistants), PMPs (Portable Multimedia Player), navigation devices, and the like.

Figure 1:
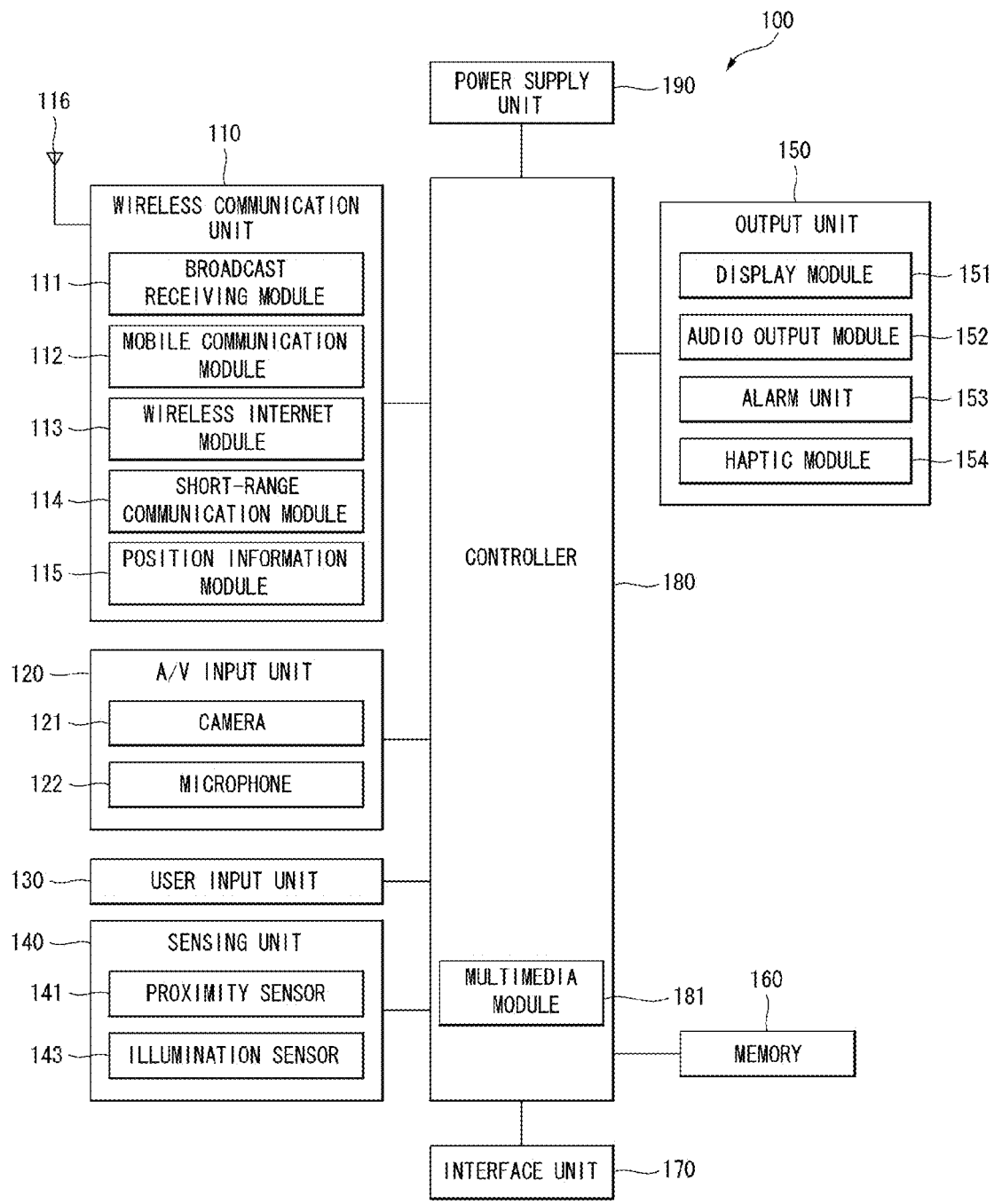
FIG. 1 is a block diagram of a mobile terminal according to an embodiment of the present invention.

FIG. 1 is a block diagram of a mobile terminal 100 according to an embodiment of the present invention. As shown, the mobile terminal 100 includes a wireless communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile terminal as having various components, but implementing all of the illustrated components is not a requirement. Greater or fewer components may alternatively be implemented.

In addition, the wireless communication unit 110 generally includes one or more components allowing radio communication between the mobile terminal 100 and a wireless communication system or a network in which the mobile terminal is located. For example, in FIG. 1, the wireless communication unit includes at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server via a broadcast channel. Further, the broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

In addition, the broadcast associated information may refer to information associated with a broadcast channel, a broadcast program or a broadcast service provider. The broadcast associated information may also be provided via a mobile communication network and, in this instance, the broadcast associated information may be received by the mobile communication module 112.

Further, the broadcast signal may exist in various forms. For example, the broadcast signal may exist in the form of an electronic program guide (EPG) of the digital multimedia broadcasting (DMB) system, and electronic service guide (ESG) of the digital video broadcast-handheld (DVB-H) system, and the like.

The broadcast receiving module 111 may also be configured to receive signals broadcast by using various types of broadcast systems. In particular, the broadcast receiving module 111 can receive a digital broadcast using a digital broadcast system such as the multimedia broadcasting-terrestrial (DMB-T) system, the digital multimedia broadcasting-satellite (DMB-S) system, the digital video broadcast-handheld (DVB-H) system, the data broadcasting system known as the media forward link only) (MediaFLO®), the integrated services digital broadcast-terrestrial (ISDB-T) system, etc.

The broadcast receiving module 111 can also be configured to be suitable for all broadcast systems that provide a broadcast signal as well as the above-mentioned digital broadcast systems. In addition, the broadcast signals and/or broadcast-associated information received via the broadcast receiving module 111 may be stored in the memory 160.

In addition, the mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile terminal and may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

Further, the short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

Also, the position information module 115 is a module for checking or acquiring a location or position of the mobile terminal. The position information module 115 may acquire location information by using a global navigation satellite system (GNSS). Here, the GNSS is a standard generic term for satellite navigation systems revolving around the earth and allowing certain types of radio navigation receivers to transmit reference signals determining their location on or in the vicinity of the surface of the earth. The GNSS may include the United States' global positioning system (GPS), the European Union's Galileo positioning system, the Russian global orbiting navigational satellite system (GLONASS), COMPASS, a compass navigation system, by the People's Republic of China, and the quasi-zenith satellite system (QZSS) by Japan.

An example of GNSS is a GPS (Global Positioning System) module. The GPS module may calculate information related to the distance from one point (entity) to three or more satellites and information related to time at which the distance information was measured, and applies trigonometry to the calculated distance, thereby calculating three-dimensional location information according to latitude, longitude, and altitude with respect to the one point (entity). In addition, a method of acquiring location and time information by using three satellites and correcting an error of the calculated location and time information by using another one satellite may be also used. The GPS module may also continuously calculate the current location in real time and also calculate speed information by using the continuously calculated current location.

With reference to FIG. 1, the A/V input unit 120 is configured to receive an audio or video signal, and includes a camera 121 and a microphone 122. The camera 121 processes image data of still pictures or video obtained by an image capture device in a video capturing mode or an image capturing mode, and the processed image frames can then be displayed on a display unit 151.

Further, the image frames processed by the camera 121 may be stored in the memory 160 or transmitted via the wireless communication unit 110. Two or more cameras 121 may also be provided according to the configuration of the mobile terminal.

In addition, the microphone 122 may receive an external audio signal in a call mode, a recording mode, a voice recognition mode, and the like, and may process the received audio signal into electric audio data. The processed audio data may then be converted for output into a format transmittable to a mobile communication base station via the mobile communication module 112 for the call mode. The microphone 122 may also implement various types of noise canceling (or suppression) algorithms to cancel or suppress noise or interference generated when receiving and transmitting audio signals.

Also, the user input unit 130 can generate input data from commands entered by a user to control various operations of the mobile terminal. The user input unit 130 may include a keypad, a dome switch, a touch pad (e.g., a touch sensitive member that detects changes in resistance, pressure, capacitance, etc. due to being contacted), a jog wheel, a jog switch, and the like.

Further, the sensing unit 140 detects a current status of the mobile terminal 100 such as an opened or closed state of the mobile terminal 100, a location of the mobile terminal 100, the presence or absence of user contact with the mobile terminal 100, the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. In FIG. 1, the sensing unit 140 also includes a proximity sensor 141.

In addition, the output unit 150 is configured to provide outputs in a visual, audible, and/or tactile manner. In the example in FIG. 1, the output unit 150 includes the display module 151, an audio output module 152, an alarm unit 153, a haptic module 154, and the like. In more detail, the display module 151 can display information processed in the mobile terminal 100. For example, when the mobile terminal 100 is in a phone call mode, the display module 151 can display a User Interface (UI) or a Graphic User Interface (GUI) associated with a call or other communication.

The display module 151 may also include at least one of a Liquid Crystal Display (LCD), a Thin Film Transistor-LCD (TFT-LCD), an Organic Light Emitting Diode (OLED) display, a flexible display, a three-dimensional (3D) display, or the like. Some of these displays may also be configured to be transparent or light-transmissive to allow for viewing of the exterior, which is called transparent displays.

An example transparent display is a TOLED (Transparent Organic Light Emitting Diode) display, or the like. A rear structure of the display module 151 may be also light-transmissive. Through such configuration, the user can view an object positioned at the rear side of the terminal body through the region occupied by the display module 151 of the terminal body.

Further, the mobile terminal 100 may include two or more display modules according to its particular desired embodiment. For example, a plurality of display modules may be separately or integrally disposed on one surface of the mobile terminal, or may be separately disposed on mutually different surfaces.

Meanwhile, when the display module 151 and a sensor (referred to as a 'touch sensor', hereinafter) for detecting a touch operation are overlaid in a layered manner to form a touch screen, the display module 151 can function as both an input device and an output device. The touch sensor may have a form of a touch film, a touch sheet, a touch pad, and the like.

Further, the touch sensor may be configured to convert pressure applied to a particular portion of the display module 151 or a change in the capacitance or the like generated at a particular portion of the display module 151 into an electrical input signal. The touch sensor may also be configured to detect the pressure when a touch is applied, as well as the touched position and area.

When there is a touch input with respect to the touch sensor, corresponding signals are transmitted to a touch controller, and the touch controller processes the signals and transmits corresponding data to the controller 180. Accordingly, the controller 180 can recognize which portion of the display module 151 has been touched.

With reference to FIG. 1, the proximity sensor 141 may be disposed within or near the touch screen. in more detail, the proximity sensor 141 is a sensor for detecting the presence or absence of an object relative to a certain detection surface or an object that exists nearby by using the force of electromagnetism or infrared rays without a physical contact. Thus, the proximity sensor 141 has a considerably longer life span compared with a contact type sensor, and can be utilized for various purposes.

Examples of the proximity sensor 141 include a transmission type photoelectric sensor, a direct reflection type photoelectric sensor, a mirror-reflection type photo sensor, an RF oscillation type proximity sensor, a capacitance type proximity sensor, a magnetic proximity sensor, an infrared proximity sensor, and the like. When the touch screen is the capacitance type, proximity of the pointer is detected by a change in electric field according to the proximity of the pointer. In this instance, the touch screen (touch sensor) may be classified as a proximity sensor.

In the following description, for the sake of brevity, recognition of the pointer positioned to be close to the touch screen will be called a 'proximity touch', while recognition of actual contacting of the pointer on the touch screen will be called a 'contact touch'. Further, when the pointer is in the state of the proximity touch, it means that the pointer is positioned to correspond vertically to the touch screen.

By employing the proximity sensor 141, a proximity touch and a proximity touch pattern (e.g., a proximity touch distance, a proximity touch speed, a proximity touch time, a proximity touch position, a proximity touch movement state, or the like) can be detected, and information corresponding to the detected proximity touch operation and the proximity touch pattern can be output to the touch screen.

Further, the audio output module 152 can convert and output as sound audio data received from the wireless communication unit 110 or stored in the memory 160 in a call signal reception mode, a call mode, a record mode, a voice recognition mode, a broadcast reception mode, and the like. Also, the audio output module 152 can provide audible outputs related to a particular function performed by the mobile terminal 100 (e.g., a call signal reception sound, a message reception sound, etc.). The audio output module 152 may also include a speaker, a buzzer, or the like. In addition, the audio output module 152 may output a sound through an earphone jack.

In addition, the alarm unit 153 can output information about the occurrence of an event of the mobile terminal 100. Typical events include call reception, message reception, key signal inputs, a touch input etc. In addition to audio or video outputs, the alarm unit 153 can provide outputs in a different manner to inform about the occurrence of an event. For example, the alarm unit 153 can provide an output in the form of vibrations. The video signal or the audio signal may be also output through the display module 151 or the audio output module 152.

In addition, the haptic module 154 generates various tactile effects the user may feel. One example of the tactile effects generated by the haptic module 154 is vibration. The strength and pattern of the haptic module 154 can also be controlled. For example, different vibrations may be combined to be output or sequentially output.

Besides vibration, the haptic module 154 can generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may also be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

Further, the memory 160 can store software programs used for the processing and controlling operations performed by the controller 180, or temporarily store data (e.g., a phonebook, messages, still images, video, etc.) that are input or output. In addition, the memory 160 may store data regarding various patterns of vibrations and audio signals output when a touch is input to the touch screen.

The memory 160 may also include at least one type of storage medium including a flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

Also, the interface unit 170 serves as an interface with external devices connected with the mobile terminal 100. For example, the external devices can transmit data to an external device, receive and transmit power to each element of the mobile terminal 100, or transmit internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may also be a chip that stores various types of information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device can be connected with the mobile terminal 100 via a port.

When the mobile terminal 100 is connected with an external cradle, the interface unit 170 can also serve as a passage to allow power from the cradle to be supplied therethrough to the mobile terminal 100 or serve as a passage to allow various command signals input by the user from the cradle to be transferred to the mobile terminal therethrough. Various command signals or power input from the cradle may operate as signals for recognizing that the mobile terminal is properly mounted on the cradle.

In addition, the controller 180 controls the general operations of the mobile terminal. For example, the controller 180 performs controlling and processing associated with voice calls, data communications, video calls, and the like. In the example in FIG. 1, the controller 180 also includes a multimedia module 181 for reproducing multimedia data. The multimedia module 181 may be configured within the controller 180 or may be configured to be separated from the controller 180. The controller 180 can also perform a pattern recognition processing to recognize a handwriting input or a picture drawing input performed on the touch screen as characters or images, respectively.

Also, the power supply unit 190 receives external power or internal power and supplies appropriate power required for operating respective elements and components under the control of the controller 180. Further, various embodiments described herein may be implemented in a computer-readable or its similar medium using, for example, software, hardware, or any combination thereof.

For a hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For a software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Figure 2A:
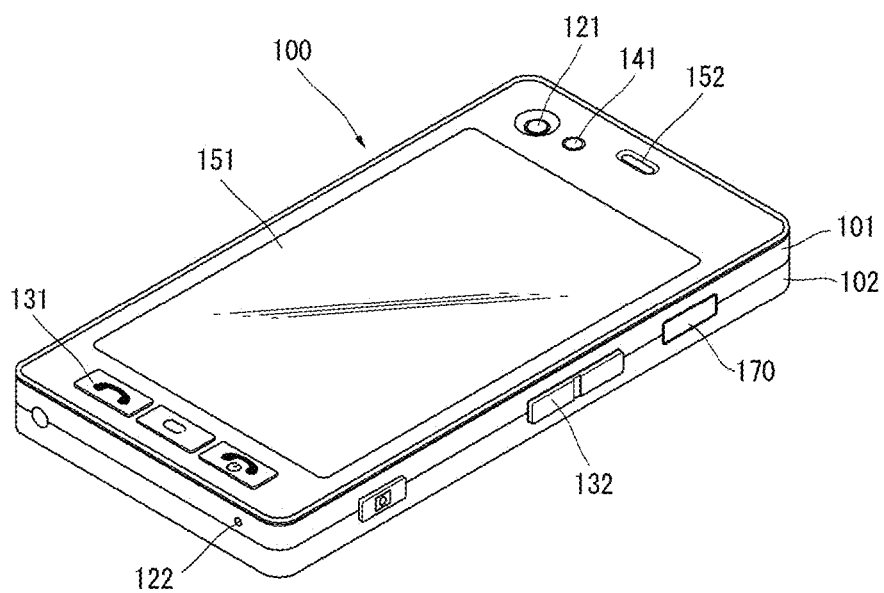
FIG. 2A is a front perspective view of the mobile terminal according to an embodiment of the present invention.

FIG. 2A is a perspective diagram of a front side of the mobile terminal 100 according to an embodiment of the present disclosure. The mobile terminal 100 is configured to have a bar-type terminal body. Yet, the mobile terminal 100 may be implemented in a variety of different configurations. Examples of such configurations include a folder-type, a slide-type, a rotational-type, a swing-type and combinations thereof. For clarity, the remainder of the disclosure will discuss the mobile terminal 100 directed to the bar-type terminal body. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric or electronic parts are loaded in a space provided between the front case 101 and rear case 102. Optionally, at least one middle case can be additionally provided between the front case 101 and rear case 102.

The cases 101 and 102 can be formed by injection molding of synthetic resin or can be formed of metal substances such as stainless steel or titanium.

The front case 101 of the mobile terminal 100 can include at least the display module 151, the audio output module 152, a camera 121, user input units 131 and 132, the microphone 122, or the interface unit 170.

The display module 151 occupies most of a main face of the front case 101. The audio output unit 151 and the camera 121 are provided on an area adjacent to one of two end portions of the display module 151, while the user input unit 131 and the microphone 122 are provided to another area adjacent to the other end portion of the display module 151. The user input unit 132 and the interface unit 170 can be provided on lateral sides of the front case 101 and rear case 102.

The input unit 130 is manipulated to receive a command for controlling an operation of the mobile terminal 100. The input unit 130 is able to include a plurality of manipulating units 131 and 132. The manipulating units 131 and 132 can be named a manipulating portion and may adopt any mechanism of a tactile manner that enables a user to perform a manipulation action by sensing a tactile feedback.

Content input by the first manipulating unit 131 or second manipulating unit 132 can be diversely set. For instance, commands such as start, end or scroll can be input to the first manipulating unit 131. On the other hand, commands directed to adjusting a volume of sound outputting from the audio output module 152 or switching to a touch recognizing mode of the display module 151 can be input to the second manipulating unit 132.

Figure 2B:
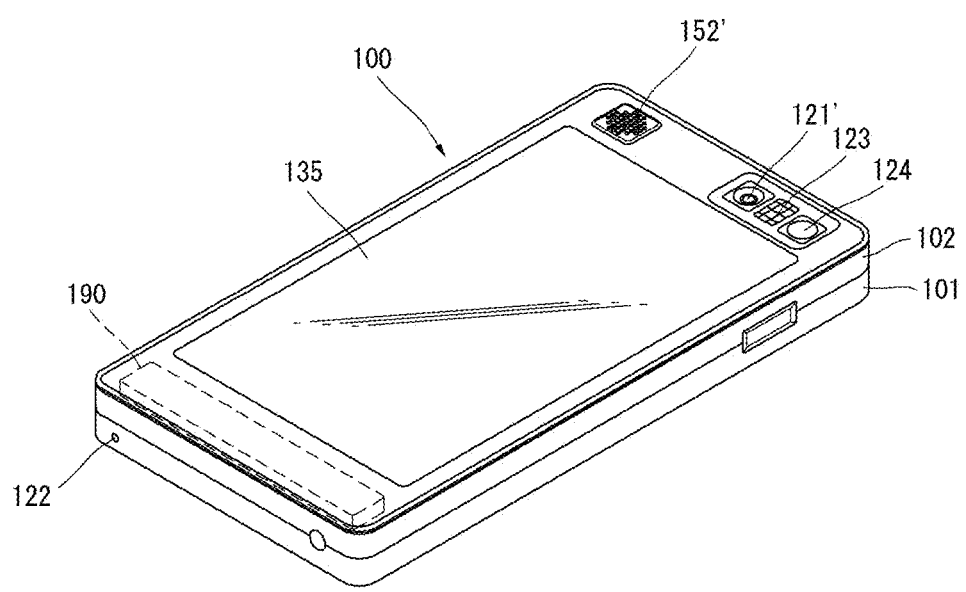
FIG. 2B is a rear perspective view of the mobile terminal according to an embodiment of the present invention.

FIG. 2B is a perspective diagram of a backside of the mobile terminal 100 shown in FIG. 2A. Referring to FIG. 2B, a camera 121' can be additionally provided to a backside of the mobile terminal 100, and more particularly, to the rear case 102. The camera 121' has a photographing direction that is substantially opposite to that of the camera 121 shown in FIG. 2A and may have a different number of pixels to provide a different resolution from that of the camera 121.

Preferably the camera 121 can have enough resolution to capture and transmit a picture of a user's face for a video call, while the camera 121' has a higher resolution for capturing a general subject for photography without transmitting the captured subject. Each of the cameras 121 and 121' can be installed in the mobile terminal 100 to be rotated open or popped open.

The flash module 123 and the mirror module 124 are additionally provided adjacent to the camera 121'. The flash module 123 projects light toward a subject in case of photographing the subject using the camera 121'. In case that a user attempts to take a picture of the user (e.g., self-photography) using the camera 121', the mirror module 124 enables the user to view user's face reflected by the mirror module 124.

An additional audio output module 152' can be provided to the backside of the mobile terminal 100. The additional audio output module 152' is able to implement a stereo function together with the audio output module 152 shown in FIG. 2A and may be used to implement a speakerphone mode when the mobile terminal 100 is configured in the phone call mode.

The broadcast signal antenna 116 can be provided to the lateral side of the mobile terminal 100 to provide further communication capabilities to the mobile terminal 100. The broadcast signal antenna 116 can be constructed as a portion of the broadcast receiving module 111 shown in FIG. 6B. Additionally, the broadcast signal antenna 116 can be configured to be retractable in the mobile terminal 100.

The power supply unit 190 for supplying power to the mobile terminal 100 can be configured to be built within the mobile terminal 100. Alternatively, the power supply unit 190 can be configured to be detachably connected to the mobile terminal 100.

A touchpad 135 for detecting a touch can be additionally provided to the rear case 102. The touchpad 135 can be configured in a light transmittive type like the display module 151. In this case, if the display module 151 is configured to output visual information from its both faces, it is able to recognize the visual information via the touchpad 135 as well. The information output from both of the faces can be entirely controlled by the touchpad 135. Alternatively, a display is further provided to the touchpad 135 so that a touchscreen can be provided to the rear case 102 as well.

The touchpad 135 is activated by interconnecting with the display module 151 of the front case 101. The touchpad 135 can be provided in rear of the display module 151 in parallel. The touchpad 135 can have a size equal to or smaller than that of the display module 151.

Figure 3:
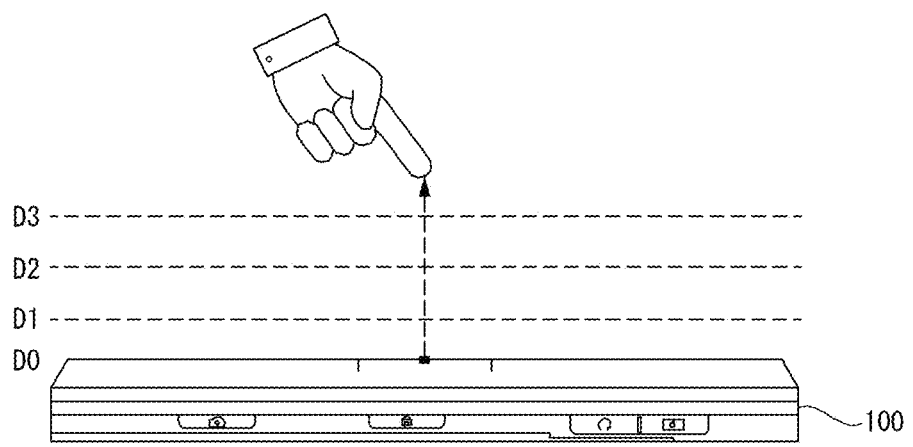
FIG. 3 is a conceptional view for explaining a proximity depth of a proximity sensor.

Next, FIG. 3 is a conceptual view illustrating a proximity depth of the proximity sensor 141. As shown in FIG. 3, when a pointer such as the user's finger, a pen, or the like, approaches the touch screen, the proximity sensor 141 disposed within or near the touch screen detects it and outputs a proximity signal. The proximity sensor 141 may also be configured to output a different proximity signal according to the distance (referred to as a 'proximity depth', hereinafter) between the closely touched pointer and the touch screen.

FIG. 3 also shows the section of the touch screen with the proximity sensor 141 for detecting, for example, three proximity depths. The proximity sensor 141 may detect three or less or four or more proximity depths. In more detail, when the pointer is fully brought into contact with the touch screen d0, this position is recognized as a contact touch. When the pointer is positioned to be spaced apart by shorter than a distance d1 on the touch screen, this position is recognized as a proximity touch with a first proximity depth.

If the pointer is positioned to be spaced apart by the distance longer than the distance d1 but shorter than a distance d2 on the touch screen, this position is recognized as a proximity touch with a second proximity depth. Also, if the pointer is positioned to be spaced apart by the distance longer than the distance d2 but shorter than a distance d3, this position is recognized as a proximity touch with a third proximity depth. If the pointer is positioned to be spaced apart by longer than the distance d3 on the touch screen, this position is recognized that the proximity touch has been released.

Accordingly, the controller 180 can recognize the proximity touches as various input signals according to the proximity depths and proximity positions of the pointer, and control various operations according to the various input signals.

Figure 4:
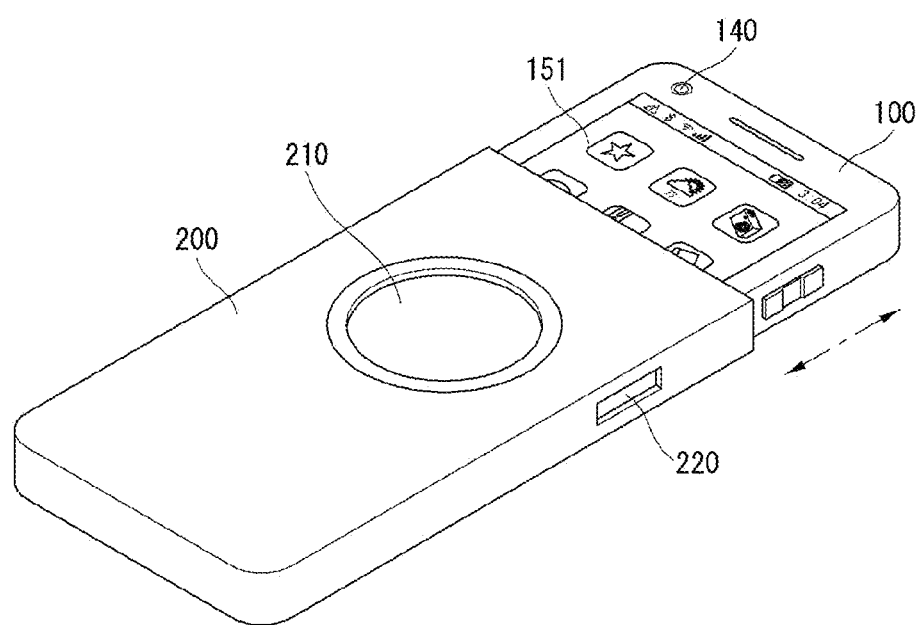
FIG. 4 is a view illustrating an example of a case receiving the mobile terminal according to an embodiment of the present invention.

FIG. 4 is a view illustrating an example of a case receiving the mobile terminal according to an embodiment of the present invention. With reference to FIG. 4, the case 200 is able to accommodate (or receive) the mobile terminal 100 (or a main body of the mobile terminal 100).

The case 200 may have a plurality of faces and include an opening 210 exposing at least a portion of the touch screen 151 in a state in which the mobile terminal 100 is accommodated therein. The opening 210 may be variably modified and implemented. For example, as shown in FIG. 4, the opening 210 may have a circular shape such that it can corresponding to a portion of the touch screen 151 of the mobile terminal 100.

The case 200 may have a coupling unit for coupling the mobile terminal 100 after the mobile terminal is received in the case 200. The coupling unit may have a contact point formed on an inner surface of the case 200 and brought into contact with a certain contact point formed on an outer surface of the main body of the mobile terminal 100 as the mobile terminal 100 is received in the case 200. As the contact point of the case 200 and that of the mobile terminal 100 are brought into contact with each other, whether or not the mobile terminal 100 is accommodated in the case 200 can be detected. The coupling unit will be described later with reference to FIGS. 6A and 6B.

The case 200 may have a recess 220 allowing for an access to the user input unit 130 protruded from an outer surface (or a side surface) of the body of the mobile terminal 100 in a state in which the mobile terminal 100 is accommodated in the case 200.

Meanwhile, the opening 210 of the case 200 may include a protective film formed on an inner face or an outer face of the case 200 in order to protect the touch screen 151 of the mobile terminal 100 when the mobile terminal 100 is accommodated.

The case 200 is not limited to the shape as shown in FIG. 4. For example, the case 200 may be provided to cover the entire surface of the touch screen 151 of the mobile terminal 100. Meanwhile, the opening 210 is formed to expose a portion of the touch screen 151, but it can be variably modified and implemented to expose the entire regions of the touch screen 151, as well as a portion of the touch screen 151.

Hereinafter, the process of changing an operation mode of the mobile terminal 100 from a first operation mode to a second operation mode in accommodating the mobile terminal 100 to the foregoing case 200 will now be described with reference to FIG. 5 and other drawings.

Figure 5:
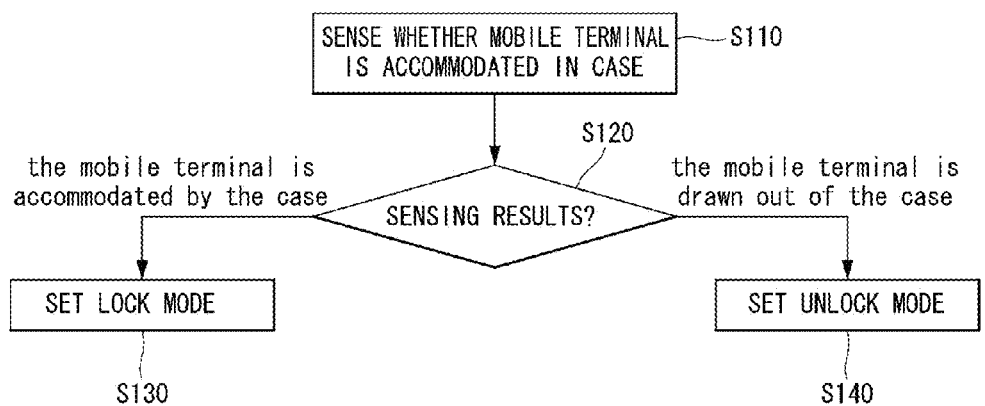
FIG. 5 is a flowchart illustrating the process of a method for controlling a mobile terminal according to an embodiment of the present invention.
Figure 6A:
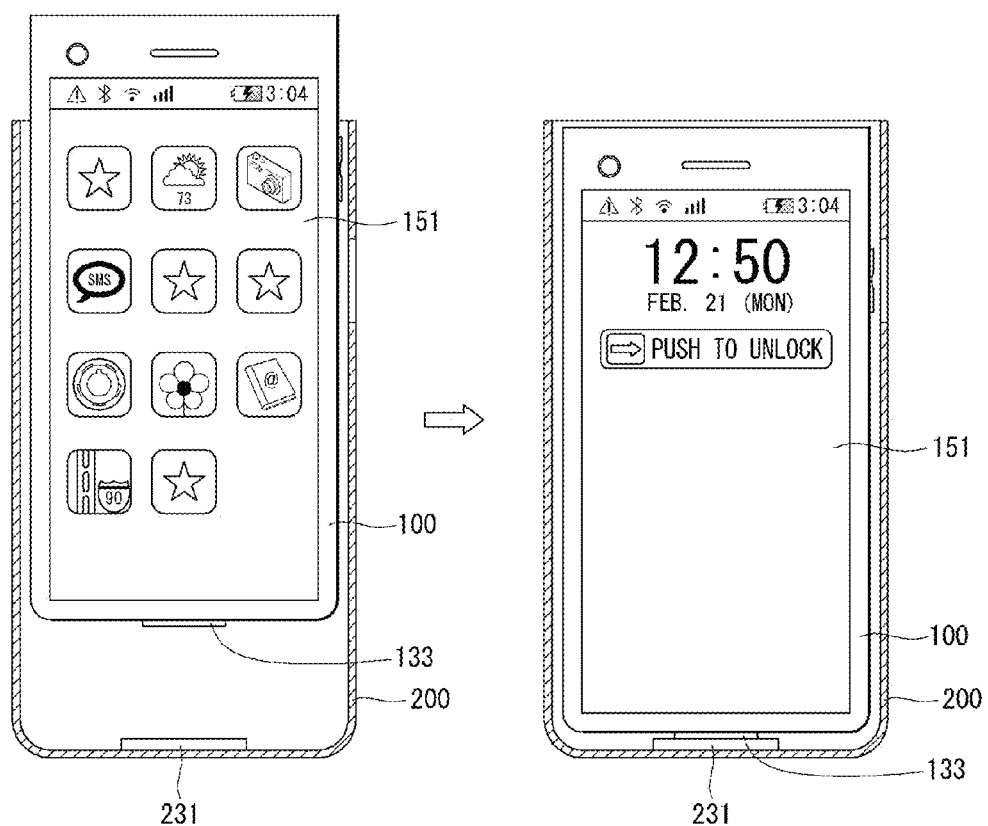

FIG. 5 is a flowchart illustrating the process of a method for controlling a mobile terminal according to an embodiment of the present invention. FIGS. 6A to 7 are views illustrating examples of the method for controlling a mobile terminal according to the embodiments illustrated in FIG. 5.

Figure 6B:
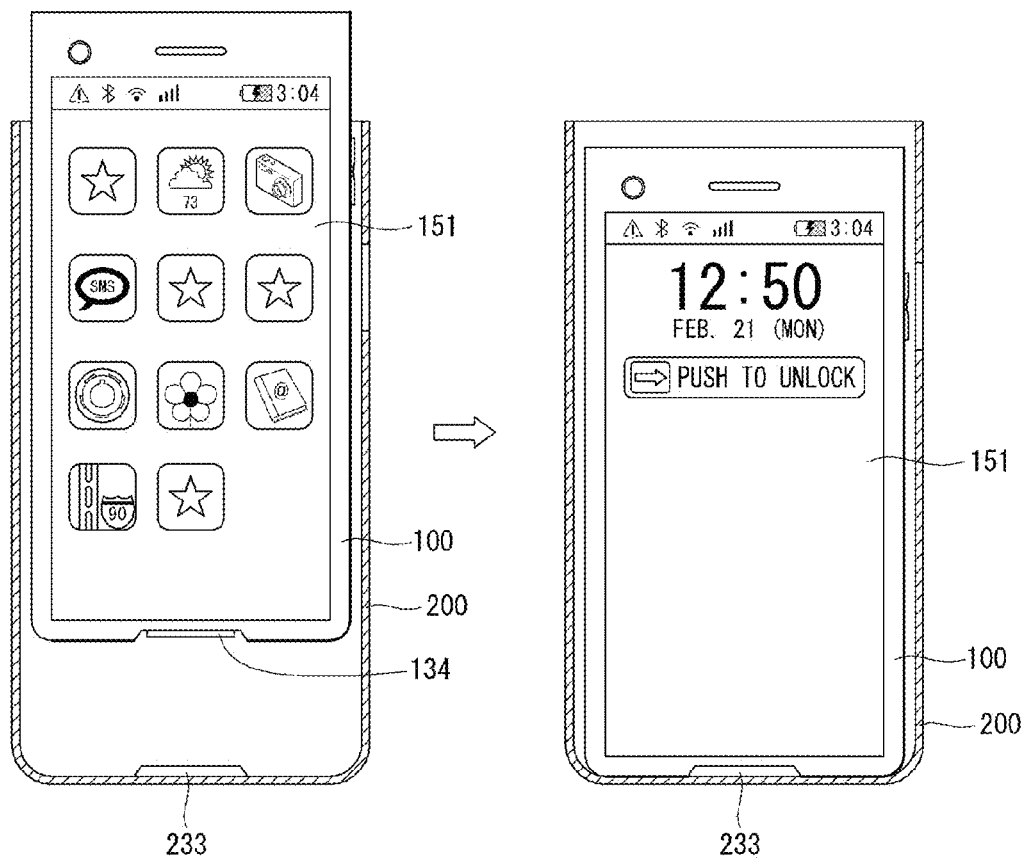

With reference to FIGS. 5 to 6B, it is assumed that the mobile terminal 100 is unlocked before it is accommodated in the case 200. First, with respect to the case 200 in which the mobile terminal 100 is accommodated, the mobile terminal 100 can detect whether the mobile terminal 100 has been accommodated by the case 200 through the sensing unit 140 in operation S110.

According to the sensing results of sensing unit 140 in operation S120, when the mobile terminal 100 is accommodated by the case 200, an operation mode of the mobile terminal 100 may be changed to a lock mode in operation S130, and when the mobile terminal 100 is drawn out of the case 200, the operation mode of the mobile terminal may be changed to an unlock mode in operation S140.

Referring to FIG. 6A, the sensing unit may be a contact point 133 provided on an outer surface of the mobile terminal 100. The sensing unit may be a second contact point 133 provided to a position corresponding to a first contact point 231 formed on the case 200 and brought into contact with the first contact point 231 when the mobile terminal 100 is accommodated by the case 200 (See FIG. 6A).

Meanwhile, as shown in FIG. 6A, the coupling structure and configuration of the first contact point 231 provided to the case 200 and the second contact point 133 provided to the body of the mobile terminal 100 are mere illustrative. Namely, the first contact point 231 and the second contact point 133 may be modified and implemented as shown in FIG. 6B.

For example, with reference to FIG. 6B, a second contact point 134 and a first contact point 233 may be coupled in the form of a button. Namely, the second contact point 134 may be provided to a position corresponding to the first contact point 233 provided to the case 200, so it can be elastically coupled with the first contact point 233 when the mobile terminal 100 is accommodated in the case 200.

As described above, when the mobile terminal 100 is elastically coupled with the case 200 through the contact points, the operation mode may be set to be the lock mode, and when the elastic coupling is released, the operation mode may be set to be the unlock mode.

In the above description, it is assumed that the mobile terminal 100 is in the lock mode before it is accommodated in the case 200, but the present invention is not limited thereto. For example, before the mobile terminal 100 is accommodated in the case 200, the mobile terminal 100 may enter the lock mode according to a user manipulation, and when the first contact point 231,233 and the second contact point 133,134 come into contact with each other while the mobile terminal 100 is in the lock mode, the controller 180 does not change the operation mode of the mobile terminal 100 to a different mode.

Meanwhile, in order to detect an interaction between the mobile terminal 100 and the case 200, the mobile terminal 100 may include the illumination sensor 143.

The proximity sensor 141 may sense brightness of the outside of the mobile terminal 100.

For example, as shown in FIG. 7, when the mobile terminal 100 is completely accommodated in the case so as to be blocked by the case, a sensing signal value of the illumination sensor 143 is 0, and sensing signal value of the illumination sensor 143 in FIGS. 7(*b*) and 7(*c*) may be 1.

Thus, when the sensing signal value of the illumination sensor 143 is changed from 0 to 1 or from 1 to 0, the controller 180 may change the operation mode of the mobile terminal 100 from the first operation mode to the second operation mode.

According to an embodiment of the present invention, when the mobile terminal 100 is accommodated in the case 200, the illumination sensor 141 provided to the body of the mobile terminal 100 is blocked by the case 200. Accordingly, the sensing results sensed by the illumination sensor 143 is transferred to the controller 180, and the controller 180 may change the operation mode of the mobile terminal 100 to the lock mode (See FIG. 7(*a*)).

In a state in which the mobile terminal is accommodated in the case 200 in the lock mode, when the mobile terminal 100 is drawn out of the case 200, the illumination sensor 143 senses external light and transfers the sensing results to the controller 180. Then, the controller 180 may change the operation mode of the mobile terminal from the lock mode to the unlock mode.

Namely, in general, when the mobile terminal is in the lock mode, the lock mode can be released through a user manipulation of releasing the lock mode state, e.g., a user manipulation with respect to an icon related to a mode conversion, such as drawing a particular pattern on the touch screen 151 to corresponding to the unlock mode, tracing manipulation, or the like.

However, in the embodiments of the present invention, when the mobile terminal 100 accommodated in the case is drawn out of the case 200, the lock mode can be automatically released through interaction between the case 200 and the mobile terminal 100.

Meanwhile, when the mobile terminal 100 is changed to the lock mode, the controller 180 may display a unique image of the lock mode, or in order to allow the user to recognize that a user access to the screen in an active mode state is limited by intuition, the controller 180 may make the brightness of the screen blur.

When the lock mode is released, the controller 180 may display user accessible applications or menus on the touch screen 151. Thus, in the present embodiment of the present invention, as shown in FIG. 7, when the mobile terminal 100 is released from the case 200, the user accessible image can be displayed on the touch screen 151 without having to perform an unlocking process.

The function of controlling the mobile terminal in one of the lock mode and unlock mode according to whether or not the mobile terminal is accommodated in the case which can accommodate a mobile terminal has been described.

Hereinafter, an example in which when a particular event occurs with the mobile terminal accommodated in the case, the mobile terminal is drawn out of the case to perform the function related to the particular event will be described with reference to FIGS. 8 to 10. Also, an example in which when a particular event occurs with the mobile terminal accommodated in the case, the mobile terminal performs a function related to the particular event in a state of being accommodated in the case will be described with reference to FIGS. 11 to 14.

FIG. 8 is a flowchart illustrating the process of a method for controlling a mobile terminal according to an embodiment of the present invention. FIGS. 9 and 10 are views illustrating examples of the method for controlling a mobile terminal according to the embodiments illustrated in FIG. 8.

With reference to FIG. 8, the controller determines whether or not the mobile terminal 100 is accommodated in the lock mode in operation S210.

Whether the mobile terminal 100 has been received in the case 200 can be determined by being mechanically connected with the contact point provided to the case 200. Or, whether the mobile terminal 100 has been received in the case 200 can be determined through the illumination sensor which is provided to an outer surface of the body of the mobile terminal 100 and senses external brightness. Detection as to whether the mobile terminal 100 has been received can be variably modified and implemented without being limited to the foregoing example.

When a particular event occurs in the state in which the mobile terminal 100 is accommodated in the case 200 in the lock mode in operation S220, the controller 180 may display information indicating the occurrence of an event at a particular region (151a) corresponding to the opening provided to the case, among the regions of the touch screen 151 in operation S230.

The particular region (151a) of the touch screen 151 corresponding to the opening can be previously set. For example, when a plurality of cases having openings each having a different shape and size exist, the controller 180 may store information regarding the shapes and sizes of the openings corresponding to the plurality of cases. Thus, when the type of the case 200 applied to the mobile terminal 100 is changed, the information regarding the opening may be differently applied through a user manipulation.

The controller 180 may display information indicating the occurrence of an event on a particular region of the touch screen corresponding to the changed shape and size of the opening.

The opening may be provided to a region of the case in contact with a front surface or a rear surface of the mobile terminal 100, and in a state in which the mobile terminal 100 is accommodated in the case 200, the touch screen 151 may be exposed to the outside through the opening.

The particular event may include, for example, a reception of a call, a completion of downloading, reception of external information, a completion of a pre-set task, and the like.

The event related to a call refers to a reception of a call or a case in which the user fails to answer the received call (i.e., absent call).

The completion of downloading refers to a case in which downloading of data, such as contents, or the like, which is requested by the user or automatically made is completed in the lock mode state.

The completion of a pre-set task refers to a case in which a task which is set by the user or automatically set by the controller 180 is completed in the lock mode state, and in this case, the task may be divided into a task, such as the data downloading, according to an interaction with the outside of the mobile terminal 100, and a task performed in the interior of the mobile terminal 100.

The reception of external information may be, for example, an event of reception information from the exterior, such as a reception of a message, a reception of an e-mail, a reception of update information related to an SNS, a reception of update information of various applications. Namely, the reception of external information refers to a reception of information from the exterior when the mobile terminal 100 is accommodated in the case 200 in the lock mode state.

Besides the foregoing examples, the particular event may include any event which may occur in relation to the mobile terminal 100.

Meanwhile, the information indicating the occurrence of the event may be provided as text, visualized image (or icon, etc.) corresponding to the particular event.

Figures 9A, 9B, 9C:
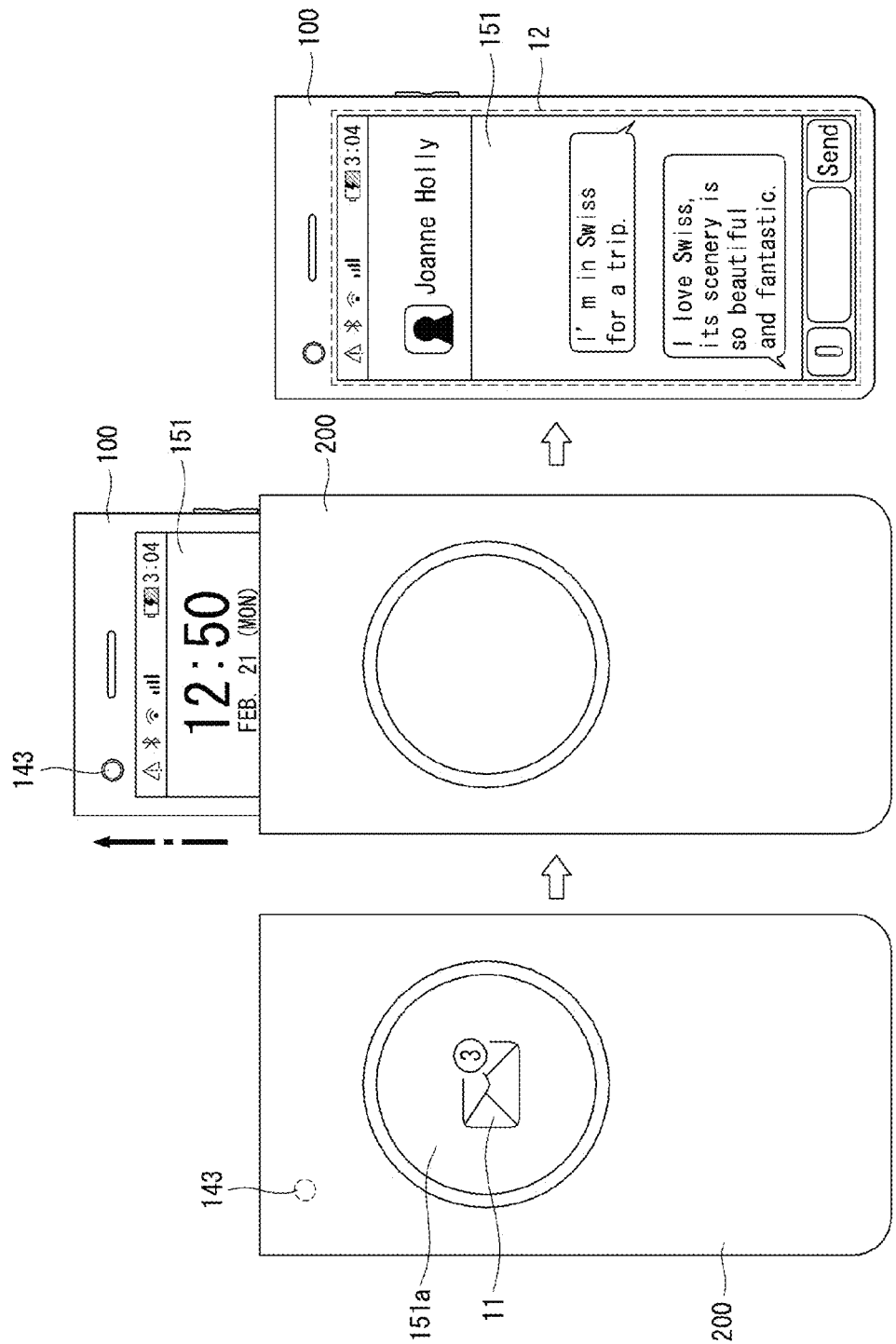

For example, with reference to FIG. 9(a), when the particular event is a reception of a text message, an icon 11 indicating the text message may be displayed on a particular region 151a of the touch screen 151. Also, with reference to FIG. 10(a) when the particular event is an event related to a reception of a call, an icon 21 indicating the call receiving may be displayed on a particular region 151a of the touch screen 151. And, when the particular event is an event indicating an absent call, among events related to a call, certain text may be displayed on a particular region 151a of the touch screen 151.

In a state in which the information indicating the occurrence of the event is displayed on a particular region of the touch screen, when the mobile terminal is detected to be drawn out of the case 200 S240 (referring to FIG. 9(b), FIG. 10(b)), the controller 180 may release the lock mode of the mobile terminal 100 in operation S250. The lock mode can be automatically released without a user manipulation immediately when the mobile terminal 100 is drawn out of the case 200.

Also, the controller 180 may release the lock mode and display an image related to the particular event on the touch screen in operation S260. For example, with reference to FIG. 9(c), when the particular event is a reception of a text message from the exterior, an image related to the particular event may be an image providing full text of the received text message. Or, with reference to FIG. 10(c), when the particular event is a reception of a call, an image related to the particular event may be an image 22 informing that a call is being connected.

In the above description, when a particular event occurs in the state in which the mobile terminal is accommodated in the case, the lock mode of the mobile terminal 100 is automatically released as the mobile terminal 100 is drawn out of the case 200 and an image related to the event is displayed on the touch screen 151. Hereinafter, an example in which a function related to an event is executed in a state in which the mobile terminal 100 is not separated from the case 200 will now be described.

Figure 11:
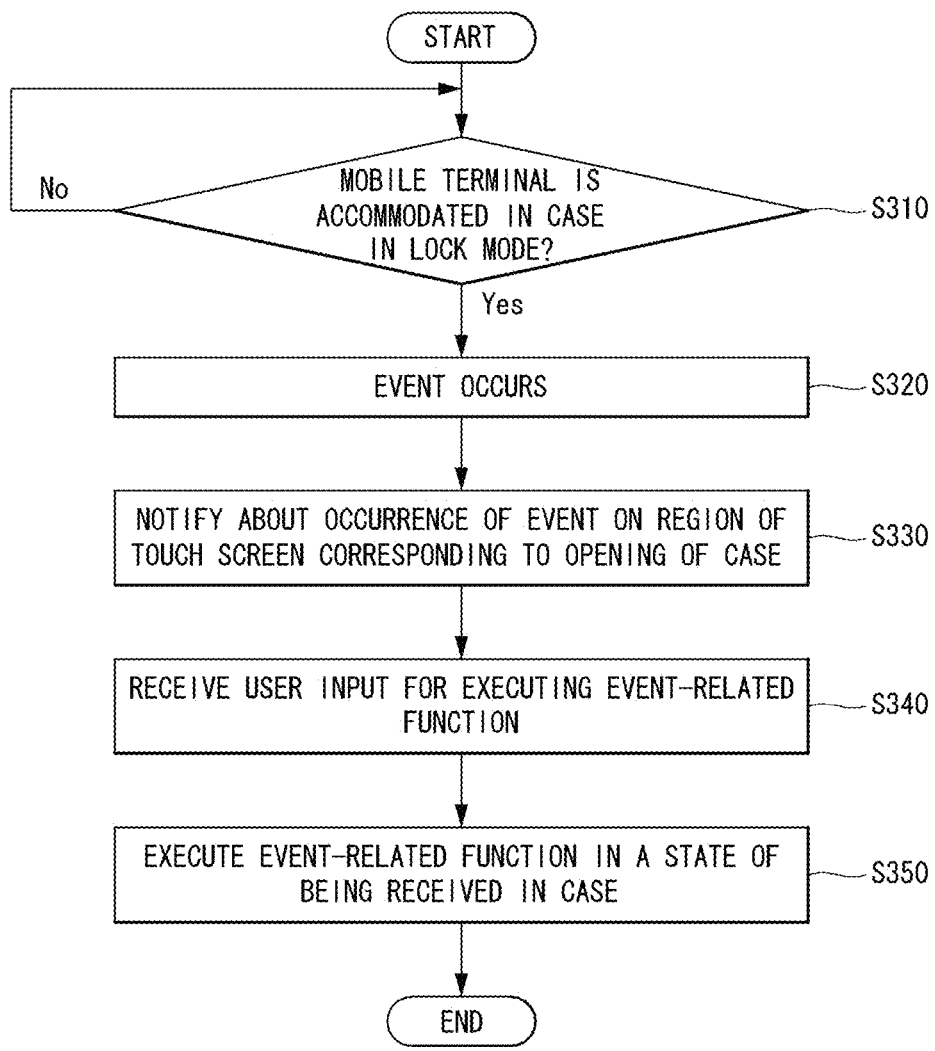
FIG. 11 is a flowchart illustrating the process of a method for controlling a mobile terminal according to an embodiment of the present invention.

FIG. 11 is a flowchart illustrating the process of a method for controlling a mobile terminal according to an embodiment of the present invention. FIGS. 12 to 14 are views illustrating examples of the method for controlling a mobile terminal according to the embodiments illustrated in FIG. 11.

With reference to FIG. 11, the controller 180 determines whether or not the mobile terminal 100 is accommodated in the case in the lock mode in operation S310. Whether or not the mobile terminal 100 is accommodated in the case 200 can be detected in the same manner as described above.

When a particular event occurs in the state in which the mobile terminal is accommodated in the case 200 in the lock mode in operation S320, the controller 180 may display information indicating the occurrence of the event on a particular region of the touch screen 151 corresponding to the opening provided to the case 200 in operation S330.

With the information indicating the occurrence of the event displayed on the particular region of the touch screen 151, the mobile terminal 100 may receive a user input for executing a function related to the event in operation S340.

The user input may include an input with respect to the user manipulation unit 132 formed on the side portion of the body of the mobile terminal 100. The user manipulation unit 132 may include various sensors. The user manipulation unit may include a button type manipulation unit, a gyro sensor, a pressure sensor, or the like.

Accordingly, as the user manipulation unit 132 is controlled in the state in which the event occurrence notification information is displayed on the particular region of the touch screen 151 corresponding to the opening, the controller may execute a function related to the particular event without releasing the lock mode in operation S350.

Figure 12A:
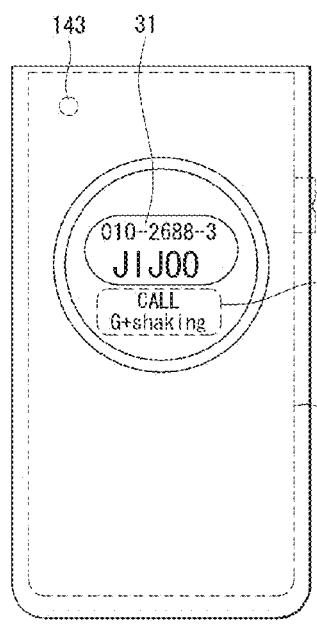

For example, with reference to FIG. 12(a), when the particular event is a call reception, the controller 180 may display received call information 31 on a particular region of the touch screen. Also, without separating the mobile terminal 100 from the case 200, the controller 180 may display guide information 32 for connecting the received call on a particular region of the touch screen together.

Figure 12B:
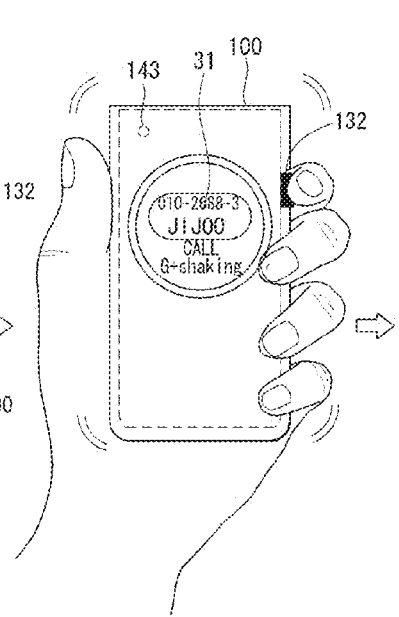
Figure 12C:
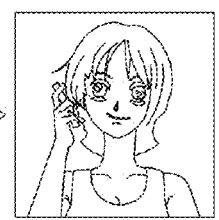

And, with reference to FIG. 12(b), the controller 180 may receive a particular user manipulation inducing a movement of the mobile terminal 100 through the user manipulation unit (e.g., a gyro sensor) 132. Upon receiving sensing results from the gyro sensor 132, the controller 180 may connect the call even in a state in which the mobile terminal 100 is not separated from the case 200 (namely, in a state in which the lock mode is not released).

Also, the user manipulation unit 132 may be a pressure sensor 132. For example, in a state in which the mobile terminal 100 is accommodated in the case 200 in the lock mode, when a call reception occurs, the user may apply certain pressure to the pressure sensor 132 for a predetermined duration. Then, with reference to FIG. 12(c) as the duration lapses, the controller 180 may connect the call even in the state in which the mobile terminal 100 is not separated from the case 200.

In the foregoing example, the user manipulation unit is assumed to be a gyro sensor and a pressure sensor, but the present invention is not limited thereto and any user manipulation for executing a function related to an event occurring in the state in which the mobile terminal 100 is not separated from the case 200 (i.e., in the lock mode state) may be included.

Figure 13A:
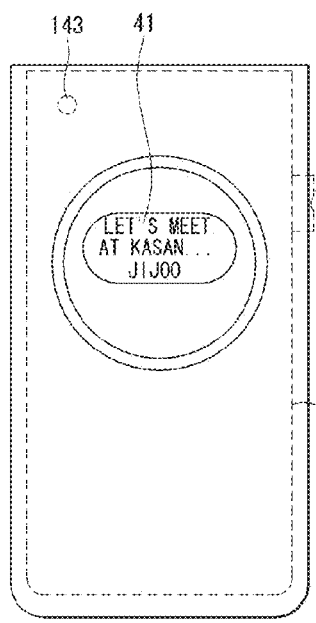
Figure 13B:
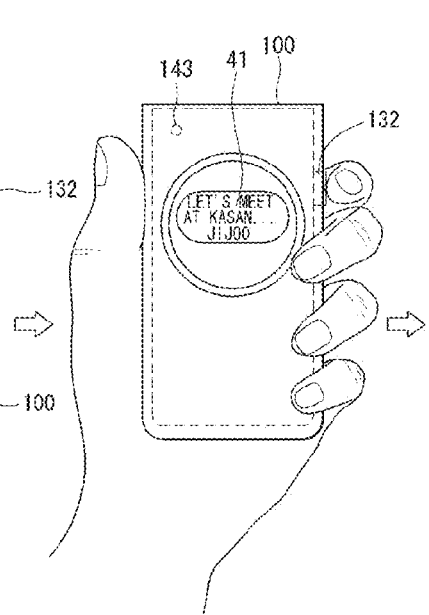
Figure 13C:

Meanwhile, with reference to FIGS. 13(a), 13(b) and 13(c), the particular event may be a reception of information from the exterior (e.g., a reception of a text message). In this case, in a state in which the mobile terminal 100 is not separated from the case 200, the controller 180 may display the received text message on a particular region of the touch screen 151 as the user manipulation unit 132 is controlled in the same manner as described above.

With reference to FIGS. 14(a) and 14(b), in the state in which the mobile terminal 100 is not separated from the case 200, generated event information may be displayed on a particular region of the touch screen 151 according to the control of the user manipulation unit 132. With reference to FIGS. 14(c) and 14(d), in case of a plurality of items of event information displayed on the particular region, when one of the plurality of items of event information is selected, the controller 180 may display the selected event information on the particular region of the touch screen 151.

In the above, the embodiments of performing the function related to a particular event occurring in the state in which the mobile terminal 100 is not separated from the case 200 have been described. Hereinafter, an example in which, with information related to the particular event displayed on a particular region of the touch screen 151, the image is changed to a different image unrelated to the particular event and displayed on the particular region of the touch screen 151.

Figures 16A, 16B, 16C:
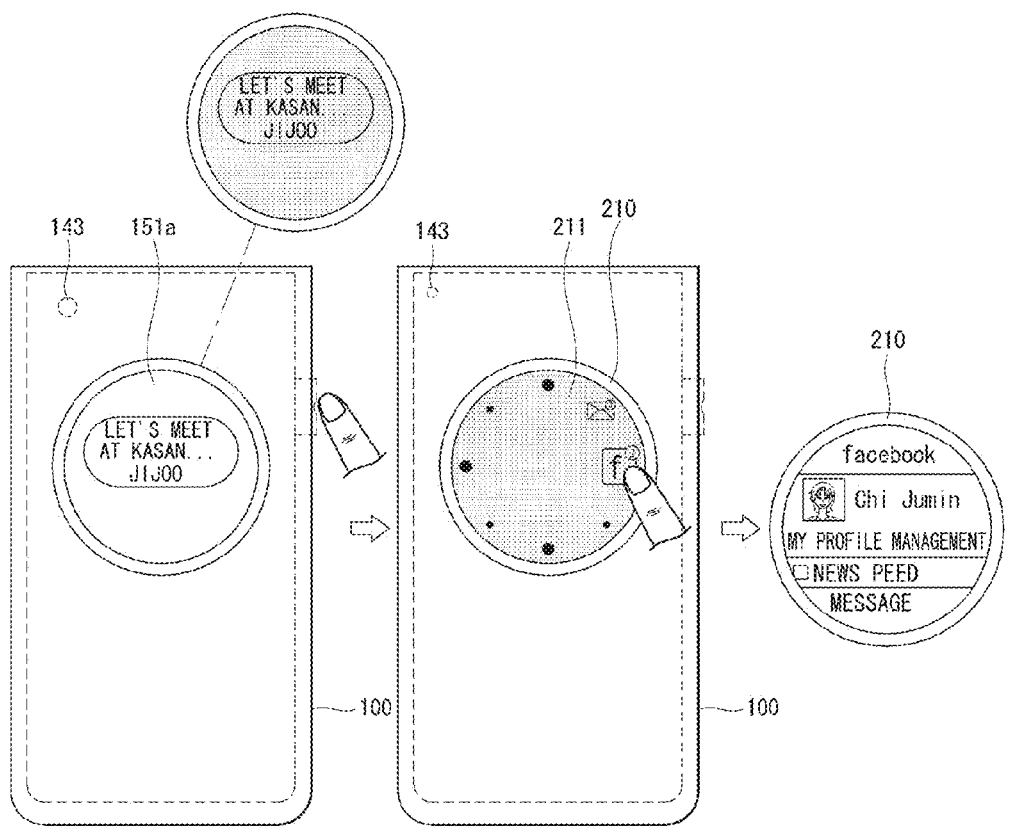
FIGS. 16(a), 16(b), and 16(c) are views illustrating an example of the method for controlling a mobile terminal according to the embodiment illustrated in FIG. 15.

FIG. 15 is a flowchart illustrating the process of a method for controlling a mobile terminal according to an embodiment of the present invention. FIGS. 16(a), 16(b), and 16(c) are views illustrating an example of the method for controlling a mobile terminal according to the embodiment illustrated in FIG. 15.

Operations S410 to S430 are the same as those described above with reference to FIGS. 8 to 11, so a description thereof will be omitted. In a state in which information indicating the occurrence of an event is displayed on a particular region of the touch screen 151 of the mobile terminal 100, the event may be terminated and a new application may be executed.

In this case, in a state in which the mobile terminal 100 is not separated from the case 200, an image for terminating the event and executing a new application may be displayed on the particular region of the touch screen 151 according to the control of the user manipulation unit 132 in operation S440 (See FIGS. 16(a) and 16(b)).

In general, the mobile terminal 100 may dispose applications for performing particular functions on the front surface of the touch screen 151. Namely, items, which are to be displayed on the entire screen, may be disposed to be displayed on the particular region of the touch screen 151 corresponding to the opening 210 in operation S450. For example, various applications may be evenly or equally on the entire regions of the touch screen 151 on a home screen. However, according to an embodiment of the present invention, the size of the opening 210 of the case 200 may be smaller than the size of the touch screen 151 of the mobile terminal 100.

Thus, the area of the particular region of the touch screen 151 corresponding to the opening 210 may be limited, so the various applications, displayed on the home screen, may be disposed to have a size appropriate for the particular region of the touch screen 151 so as to be displayed.

FIG. 16(b) shows an example in which a plurality of applications included in at least one page of the home screen are disposed in the particular region 151a of the touch screen 151 corresponding to the opening 210.

As shown in FIGS. 16(b) and 16(c), when a touch input for selecting one of the plurality of items disposed on the particular region is received in operation S460, the controller 180 may display an image related to the selected item on the particular region of the touch screen 151 in operation S470.

Meanwhile, the case 200 for accommodating the mobile terminal according to an embodiment of the present invention may include the opening 210 having a protective film 211. In this case, as shown in FIGS. 16(a), 16(b), and 16(c), when a touch input with respect to the part of the protective film 211 of the case 200 is received, the controller 180 may execute a function related to an event displayed on the region of the touch screen 151 in contact with the protective film 211.

Meanwhile, in the above description, the operation mode of the mobile terminal 100 is divided into the lock mode and the unlock mode, but the operation mode of the mobile terminal 100 may be various without being limited thereto. Namely, the operation mode of the mobile terminal may be variably divided and set according to a certain reference. For example, when a particular event occurs, a bell mode and a vibration mode may be divided on the basis of a unit for feeding back the fact of an occurrence of an event to the user.

Figure 17A:
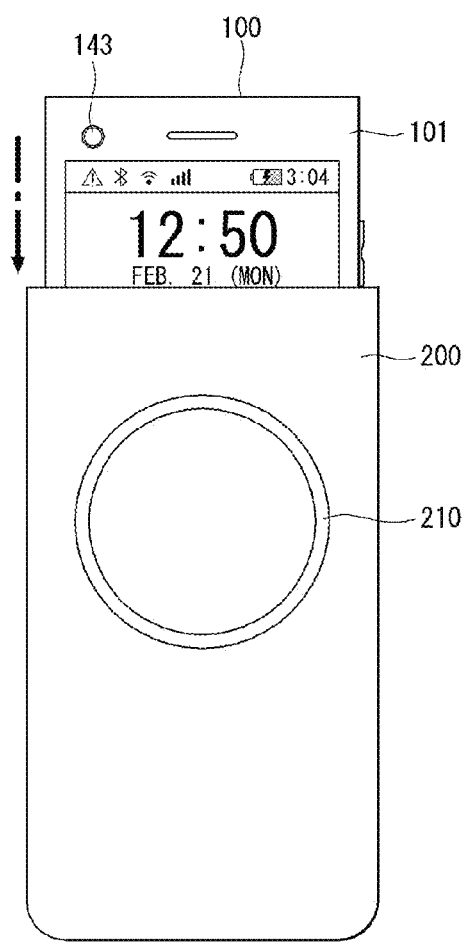
FIGS. 17(a) and 17(b) are views illustrating another example of a method for controlling a mobile terminal according to an embodiment of the present invention.
Figure 17B:
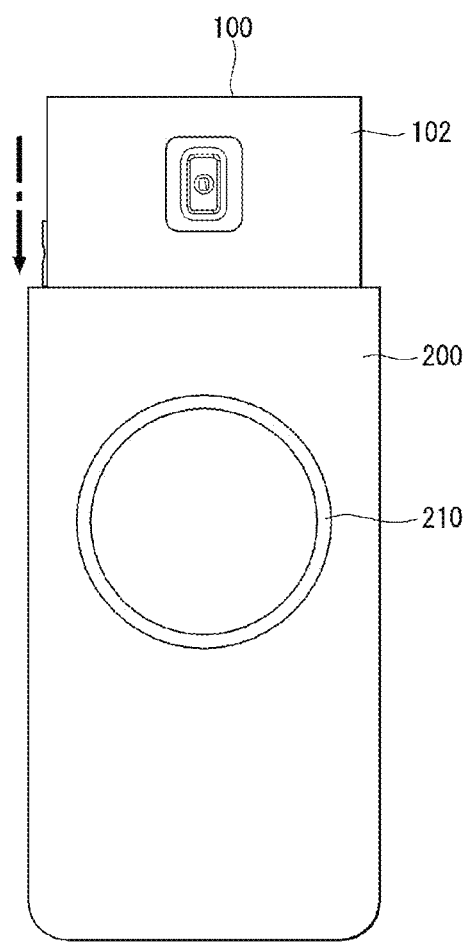

FIGS. 17(a) and 17(b) are views illustrating another example of a method for controlling a mobile terminal according to an embodiment of the present invention. Specifically, FIGS. 17(a) and 17(b) show an example in which the controller 180 sets the operation mode of the mobile terminal 100 in different modes according to a direction in which the mobile terminal 100 is received by the case 200.

With reference to FIGS. 17(a) and 17(b), when the mobile terminal 100 is received by the case 200, the controller 180 may set a first mode if the mobile terminal 100 is received such that a front case 101 comes into contact with the opening 210. Also, the controller may set a second mode, different from the first mode, if the mobile terminal 100 is received such that a rear case 102 comes into contact with the opening 210.

Whether or not the mobile terminal 100 is accommodated in the case 200 may be determined through a mechanical connection between the mobile terminal 100 and the case 200 or according to sensing results of the illumination sensor 143 of the mobile terminal 100 as described above.

The mobile terminal and the control method of the mobile terminal according to embodiments of the present invention have the following advantages.

According to an embodiment of the present invention, a user interface allowing for the user to easily and effectively control the mobile terminal can be provided to the user.

Also, according to an embodiment of the present invention, in a state in which the mobile terminal is accommodated in a certain case, the mobile terminal can be easily unlocked to immediately move to a desired user interface or application through an interaction between the mobile terminal and the case.

In addition, according to an embodiment of the present invention, in a state in which the mobile terminal is accommodated in the case, when an event related to the mobile terminal occurs, the generation of the event and/or content of the event can be effectively informed to the user.

The method for providing information of the mobile terminal according to embodiments of the present invention may be recorded in a computer-readable recording medium as a program to be executed in the computer and provided. Further, the method for controlling a mobile terminal and the method for displaying an image of a mobile terminal according to embodiments of the present invention may be executed by software. When executed by software, the elements of the embodiments of the present invention are code segments executing a required operation. The program or the code segments may be stored in a processor-readable medium or may be transmitted by a data signal coupled with a carrier in a transmission medium or a communication network.

The computer-readable recording medium includes any kind of recording device storing data that can be read by a computer system. The computer-readable recording device includes a ROM, a RAM, a CD-ROM, a DVD (ROM, a DVD-RAM, a magnetic tape, a floppy disk, a hard disk, an optical data storage device, and the like. Also, codes which are distributed in computer devices connected by a network and can be read by a computer in a distributed manner are stored and executed in the computer-readable recording medium.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds a intended to be embraced by the appended claims.

What is claimed is:

1. A mobile terminal for coupling with a case, the mobile terminal comprising:
a touchscreen, wherein a first portion of the touchscreen is exposed via an opening within the case while a remaining portion of the touchscreen is covered by the case;
a wireless communication unit configured to wirelessly communicate with external devices;
a controller configured to:
cause the touchscreen to display an application icon when the case is positioned to expose the remaining portion of the touchscreen; and
cause the touchscreen to display the application icon within the first portion of the touchscreen that is exposed via the opening, and not display the application icon at the remaining portion, when the case is positioned to cover the remaining portion of the touchscreen,
control the wireless communication unit to receive an event from at least one of the external devices while the case is positioned to cover the remaining portion of the touchscreen;
cause the touchscreen to display an indicator within the first portion of the touchscreen that is exposed via the opening in response to the receiving of the event; and
cause the touchscreen to display an execution screen within the first portion of the touchscreen that is exposed via the opening, wherein the execution screen is associated with the event, and wherein the execution screen is displayed in response to a first touch input received with regard to the displayed indicator while the case is positioned to cover the remaining portion of the touchscreen.

2. The mobile terminal of claim 1, further comprising:
a sensing unit, wherein the controller is further configured to:
determine whether the touchscreen is covered by the case according to an input provided by the sensing unit.

3. The mobile terminal of claim 2, wherein:
the sensing unit comprises an illumination sensor configured to sense external brightness, the illumination sensor located such that it is blocked when the touchscreen is covered by the case.

4. The mobile terminal of claim 1, wherein the controller is further configured to set an operation mode of the mobile terminal to either a lock mode or a unlock mode based on whether the touchscreen is covered by the case.

5. The mobile terminal of claim 4, wherein the controller is further configured to release the lock mode and cause the touchscreen to display an image related to the event when the case is positioned to expose the remaining portion of the touchscreen.

6. The mobile terminal of claim 1, further comprising:
a user input unit configured to receive user input related to operation of the mobile terminal, and wherein the controller is further configured to execute a function related to the event in response to an input received via the user input unit for executing the function, the input received via the user input unit while the case is positioned to cover the remaining portion of the touchscreen.

7. The mobile terminal of claim 6, wherein the controller is further configured to cause the touchscreen to display information received via the user input unit within the first portion of the touchscreen that is exposed via the opening.

8. The mobile terminal of claim 6, wherein the user input unit comprises a gyro sensor for sensing movement of the mobile terminal or a pressure sensor for sensing pressure applied to the mobile terminal.

9. The mobile terminal of claim 1, wherein the event comprises reception of a call, a message, an e-mail, or update information of an application.

10. The mobile terminal of claim 1, wherein the controller is further configured to:
select the application icon in response to a touch input received through the opening; and
cause the touchscreen to display an execution screen corresponding to an application associated with the application icon within the portion of the touchscreen that is exposed via the opening.

11. The mobile terminal of claim 1, wherein the controller is further configured to:
cause the touchscreen to display the application icon within the portion of the touchscreen that is exposed via the opening when the event is terminated, the application icon having been displayed on a screen prior to the case being positioned to cover the remaining portion of the touchscreen; and
the application icon is associated with a function that is different from the event.

12. The mobile terminal of claim 11, wherein:
the controller is further configured to cause the touchscreen to display an executing screen corresponding to the application icon within the first portion of the touchscreen that is exposed via the opening in response to a second touch input selecting the application icon; and
the second touch input is received through the opening while the case is positioned to cover the remaining portion of the touchscreen.

13. A method of controlling a mobile terminal, the method comprising:
determining whether a touchscreen of the mobile terminal is covered by a case, wherein when the touchscreen is covered by the case a first portion of the touchscreen is exposed via an opening within the case while a remaining portion of the touchscreen is covered by the case;
displaying, on the touchscreen, an application icon when the case is positioned to expose the remaining portion of the touchscreen;
displaying, on the touchscreen, the application icon within the first portion of the touchscreen that is exposed via the opening, and not display the application icon at the remaining portion, when the case is positioned to cover the remaining portion of the touchscreen;
receiving, via a wireless communication unit, an event from an external device while the case is positioned to cover the remaining portion of the touchscreen;
displaying, on the touchscreen, an indicator within the first portion of the touchscreen that is exposed via the opening in response to the receiving of the event; and
displaying, on the touchscreen, an execution screen within the portion of the touchscreen that is exposed via the opening, wherein the execution screen is associated with the event, and wherein the execution screen is displayed in response to a touch input received with regard to the displayed indicator while the case is positioned to cover the remaining portion of the touchscreen.

14. The mobile terminal of claim 1, wherein the controller is further configured to:
cause the touchscreen to display a plurality of application icons when the case is positioned to expose the remaining portion of the touchscreen; and
wherein a size of each of the plurality of application icons displayed when the case is positioned to expose the remaining portion of the touchscreen is different than a size of a respective one of a plurality of application icons displayed when the case is positioned to cover the remaining portion of the touchscreen.

15. The mobile terminal of claim 1, wherein the controller is further configured to:
cause the touchscreen to display a plurality of indicators within the first portion of the touchscreen that is exposed via the opening, the plurality of indicators corresponding to a respective one of a plurality of received events.

16. The mobile terminal of claim 15, wherein the controller is further configured to:
cause the touchscreen to display an execution screen of an event with regard to a selected indicator among the plurality of indicators.

* * * * *